(No Model.)

A. W. CRAM.
SELF MEASURING SUGAR BOWL OR SPICE BOX.

No. 547,334. Patented Oct. 1, 1895.

Witnesses
Geo. E. Frech
James W. Berard

Inventor
A. W. Cram
per Lehmann Pattison & Nestet
Attorneys

UNITED STATES PATENT OFFICE.

ALONZO WHEELER CRAM, OF HAVERHILL, MASSACHUSETTS.

SELF-MEASURING SUGAR-BOWL OR SPICE-BOX.

SPECIFICATION forming part of Letters Patent No. 517,334, dated October 1, 1895.

Application filed January 23, 1895. Serial No. 535,923. (No model.)

*To all whom it may concern:*

Be it known that I, ALONZO WHEELER CRAM, of Haverhill, in the county of Essex and State of Massachusetts, have invented certain new and useful Improvements in Self-Measuring Sugar-Bowls or Spice-Boxes; and I do hereby declare the following to be a full, clear, and exact description of the invention, such as will enable others skilled in the art to which it pertains to make and use it, reference being had to the accompanying drawings, which form part of this specification.

My invention relates to improvements in self-measuring sugar-bowls or spice-boxes having their bottoms so formed and constructed that when tilted they automatically release a predetermined amount of the contents.

The object of my invention is to provide a sugar or a spice box having its bottom provided with a cavity or recess and oppositely-extending walls or shields, whereby this cavity or recess becomes filled with the contents of the bowl or box when in its normal condition, and when tilted will release this measured quantity into a cup or other receptacle, thus avoiding the necessity of using a spoon and making it practical to entirely close the bowl or box to prevent the admission of dust, dirt, flies, or other insects.

Figure 1:
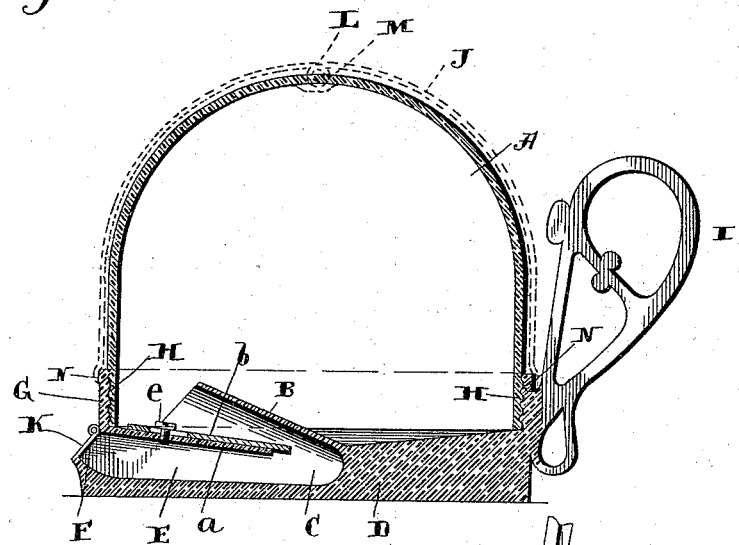
Figure 2:
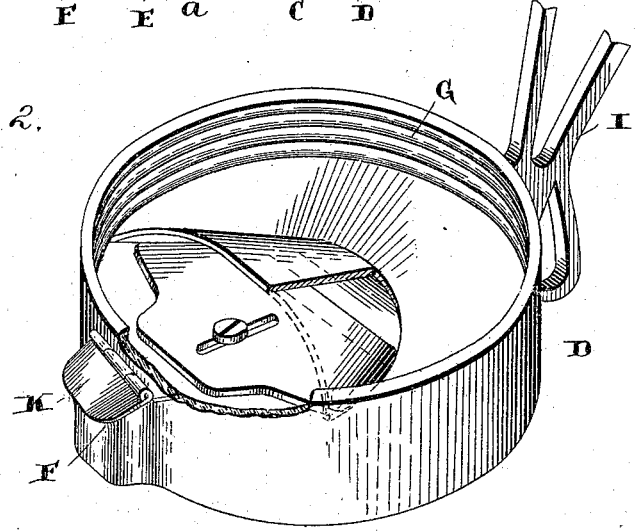

In the accompanying drawings, Figure 1 is a vertical section of a sugar-bowl or a spice-box embodying my invention. Fig. 2 is a detached perspective internal view of the bottom.

A indicates the bowl or box, which is preferably dome-shaped, as shown, and provided at its lower end, preferably, with an external screw-thread H. The bottom piece has a peripheral upwardly-extending screw-threaded flange G, which receives the external screw-threaded lower portion H of the bowl A. This bottom D is provided at that side opposite the handle I with a cavity E, and at the inner end of this cavity is an outwardly and upwardly extending flange or cover B, the outer end of the cavity E having an upwardly-extending lip F. A flange a extends inward and slightly downward from the front side of the bowl and under the upwardly-extending flange and cover B to a considerable distance, but leaving an opening or space C between its inner end and the inner end of the cavity or recess E, heretofore referred to. The outer end or exit of the recess or cavity E is closed by a gravity-door K, which being pivoted at its upper end normally closes this exit when the bowl is at rest in its normal position and preventing the access of flies, dirt, dust, and other insects. The handle I is preferably formed as a part of the bottom D.

When the bowl is at rest in its normal position, as shown in Fig. 1, the sugar or other granular contents of the bowl will by its own gravity flow through under the upper flange B and over the lower flange $a$ and through the space C into the cavity E to a certain point, according to the size of the opening C. By lifting the bowl and tilting it the measured amount will flow out of the exit of the cavity E, and no more. In this manner each time the bowl is placed at rest or held in a horizontal position and then tipped a predetermined amount of the contents thereof will be passed through the exit of the cavity E, as will be readily understood.

For the purpose of regulating the amount to be deposited in the cavity E each time the bowl is operated, the inwardly-extending flange $a$ is provided with a slide $b$, held in place by means of a screw or other suitable device $e$. By this arrangement the slide $b$ can be moved inward, thus diminishing the size of the opening G and regulating the amount of sugar or other material deposited in the cavity E.

As here shown, the top or dome portion A of the bowl is removed from the bottom D when it is to be filled, and turned up-side down and filled, and the bottom D then again screwed to position. This makes a closed bowl or box and prevents the access of moisture, dust, dirt, and insects, which is very objectionable in the ordinary sugar-bowl or spice-box.

While I prefer to have the bottom D detachable and by means of screw-threads, I do not limit myself to this particular manner of holding it in position. For instance, it may be held to the upper portion A by means of a spring-bail J, (shown in dotted lines in Fig. 1,) having a coil L, fitting in a recess M in the outer side of the top A of the dome, the ends or extremities of this bail being turned inward and entering cavities N, made in the upwardly-extending flanges of the bottom D. In this manner the bottom and top will be held together in a detachable manner. Neither do I desire to limit myself to having the top and bottom made separate, though I prefer to have them so, for the reason that an opening may be formed in the top of the dome A, through which the bowl may be filled, the opening being closed by a stopper or other suitable device.

Having thus described my invention, what I claim, and desire to secure by Letters Patent, is—

1. A bowl or box of the character described, comprising a bottom having a cavity formed directly therein, the exit end of said cavity extending through the wall of the box and opening outward, and oppositely extending separated overlapping ceilings extending from and supported by the bottom and covering said cavity, the same adapted to operate as described.

2. A bowl or box of the character described, comprising a bottom having a cavity formed directly therein, the exit end of the cavity extending through the wall of the box and opening outward, oppositely extending separated overlapping ceilings for said cavity, the under ceiling being longitudinally adjustable for the purpose described.

In testimony whereof I affix my signature in presence of two witnesses.

ALONZO WHEELER CRAM.

Witnesses:
 EMMA MENTER,
 FRED WINDLE.